United States Patent [19]

Taiani

[11] 4,396,849
[45] Aug. 2, 1983

[54] SYNCHRONOUS MAGNETIC DRIVE ASSEMBLY WITH LAMINATED BARRIER

[75] Inventor: Patrick M. Taiani, Halifax, Canada

[73] Assignee: Nova Scotia Research Foundation Corporation, Canada

[21] Appl. No.: 256,381

[22] Filed: Apr. 22, 1981

[30] Foreign Application Priority Data

May 2, 1980 [CA] Canada .................................. 351147

[51] Int. Cl.³ ........................................... H02K 49/10
[52] U.S. Cl. ...................................... 310/92; 310/86; 310/104; 310/216
[58] Field of Search .................. 310/46, 67 R, 78, 92, 310/55, 103, 104, 216, 217, 261, 266, 86, 212

[56] References Cited

U.S. PATENT DOCUMENTS

| | | | |
|---|---|---|---|
| 1,983,260 | 12/1934 | Zorzi | 230/139 |
| 1,983,262 | 12/1934 | Zorzi | 417/415 |
| 2,705,762 | 4/1955 | Pile | 310/104 |
| 2,798,173 | 7/1957 | Penlington et al. | 310/86 |
| 2,919,359 | 12/1959 | Luenberger | 310/86 |
| 3,283,187 | 11/1966 | Schaefer | 310/86 |
| 3,840,983 | 10/1974 | Ryff | 310/217 |
| 4,197,474 | 4/1980 | Honigsbaum | 310/86 |

FOREIGN PATENT DOCUMENTS

| | | | |
|---|---|---|---|
| 430923 | 10/1945 | Canada . | |
| 721835 | 11/1965 | Canada . | |
| 1020614 | 11/1977 | Canada | 310/65 |
| 1051964 | 4/1978 | Canada | 310/34 |
| 660943 | of 1938 | Fed. Rep. of Germany . | |
| 962661 | 6/1950 | France . | |
| 1210852 | of 1968 | United Kingdom . | |

OTHER PUBLICATIONS

Technischse Rundschau, 1980, No. 48, pp. 27 and 29.

*Primary Examiner*—J. D. Miller
*Assistant Examiner*—D. L. Rebsch
*Attorney, Agent, or Firm*—Roylance, Abrams, Berdo & Farley

[57] ABSTRACT

A magnetic drive assembly includes a housing having a pair of end flanges, an annular drive member containing a plurality of drive members and internally thereof a driven member containing a plurality of driven magnets. The drive and driven members are bearingly supported by the end flanges so that rotation of the drive member results, through magnetic interaction, on rotation of the driven member. A barrier separates the driven and drive members and extends between the end flanges to hermetically seal the driven member. The barrier is formed from a plurality of abutting axially adjacent annular laminations held in axial compression by the end flanges, the laminations being formed of a non-magnetic material. In one embodiment the laminations have a chevron shape in radial cross-section whereby adjacent laminations are nestable with each other. In a second embodiment the laminations are rectangular in radial cross-section and are additionally supported by a thin wall non-magnetic sleeve extending between the end flanges. The laminated barrier reduces power loss and heat generation due to eddy currents generated by the magnetic flux, and still provides sufficient stability in shear and end thrust for use in pressure vessel applications.

7 Claims, 4 Drawing Figures

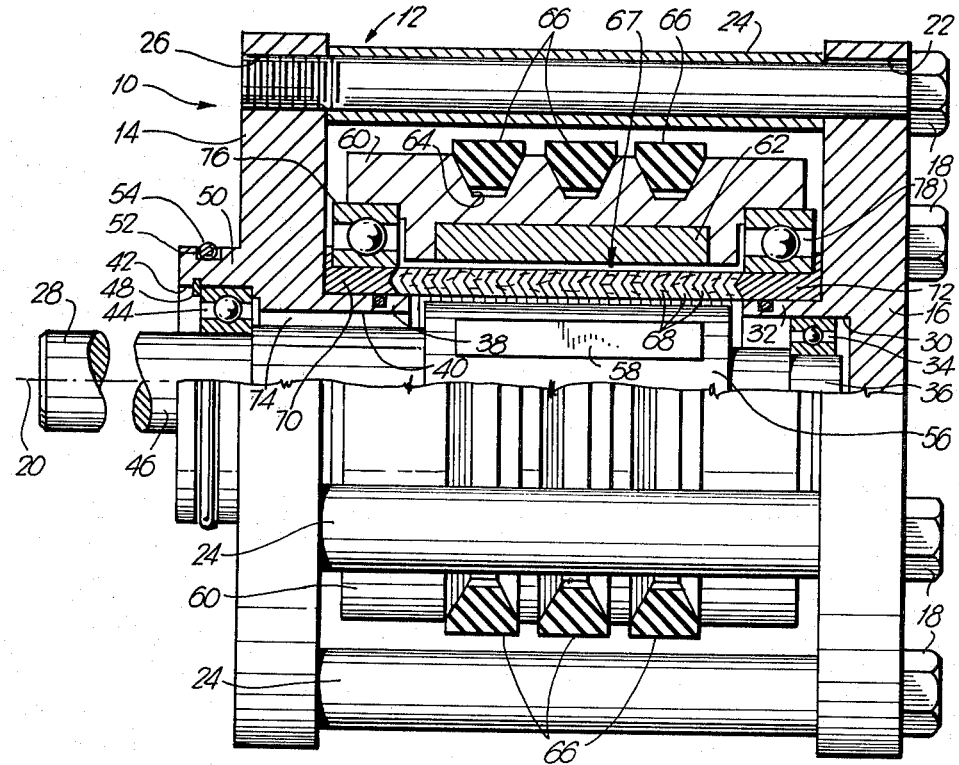

SYNCHRONOUS MAGNETIC DRIVE ASSEMBLY WITH LAMINATED BARRIER

This application is related to U.S. patent application Ser. No. 88,932, "Torque Transmitting Assembly for Rotary Valve Member", filed Oct. 29, 1979.

The present invention is directed to magnetic drive assemblies and in particular to the provision of an hermetic barrier used in such assemblies to reduce eddy current losses.

BACKGROUND OF THE INVENTION

Drive assemblies for coupling through pressure vessel barriers are known, see for example Canadian Pat. Nos. 1,020,614 issued Nov. 8, 1977 and 1,051,964 issued Apr. 3, 1978 both of which are assigned to the assignee of the present invention. However, such assemblies still present one of the fundamental problems in coupling large amounts of horsepower through metallic barriers by use of magnetic (or electric) couplings, namely the generation of power loss and heating due to eddy currents generated by the motion of the magnetic flux through the metallic barrier. Ideally, non-metallic barriers would solve this problem but such materials are not usually acceptable for use in pressure vessel applications due to stringent safety codes. The problem of eddy current generation in metals is well known and, in most applications, has been solved by the use of insulated laminations of magnetically permeable metals as in electric motors and transformers. However, in the past, the use of a laminated barrier in pressure vessels using a magnetic drive has not been accepted due to problems relating to mechanical stability of the laminations in shear and in end thrust.

As an example of a prior art attempt at achieving an acceptable structure see U.S. Pat. No. 1,983,260 (Zorzi, 1934) which illustrates a pressure vessel with an electric motor stator, utilizing the stator as an external support for a laminated cylinder. This arrangement cannot be used for a rotary magnetic coupling using permanent magnets for torque transmission, as such an arrangement requires two concentric rotating members and thus two air gaps, which dictates that the barrier must be self-supporting. In Zorzi the end flanges are retained on the device by a plurality of tie bolts which pass through the stack of laminations. Thus, the pressure rating of the Zorzi vessel would dictate the number and diameter of the tie bolts to achieve sufficient resistance to internal pressure forces; the diameter of the tie bolts would dictate the wall thickness of the laminated stack; and each bolt would have to be insulated to frustrate eddy current effects. In modern magnetic drives for pressure vessels the Zorzi construction would be unacceptable.

SUMMARY OF THE INVENTION

The problems of the prior art are overcome with the present invention by utilizing a barrier between the driver and driven magnets formed of a plurality of abutting laminations which are self-supporting and are prestressed in compression to a value that exceeds the maximum end thrust developed by the internal pressure contained by the barrier. Shear effects may be overcome by forming each annular lamination as a chevron (in radial cross-section) so that adjacent laminations nest or interlock with each other, and/or by force fitting a thin wall sleeve within the laminations. With a thin wall sleeve in place the laminations may take the form of flat washers. Hermeticity of the barrier can be enhanced by insulating each lamination and then fusing the laminations through fusing of the insulating material or even through metal-to-metal contact when the laminations are held in compression. The laminations may be formed from a metallic non-magnetic material such as stainless steel and the sleeve, if used, may be metallic or non-metallic.

In summary of the above, therefore, the present invention broadly provides a magnetic drive assembly comprising: a housing including spaced apart end flange members; an annular drive member containing a plurality of drive magnets; a cylindrical driven member containing a plurality of driven magnets, the driven and drive members being concentrically bearingly supported by the end flange members so that rotation of the drive member will result, through magnetic interaction, in rotation of the driven member; a cylindrical barrier extending between the end flange members and separating the drive member from the driven member whereby the barrier and the end flange members define a chamber containing the driven member the barrier being formed of a plurality of abutting axially adjacent annular laminations held in axial compression by the end flange members, each lamination being formed of a non-magnetic ductile material to reduce eddy current losses; and means for hermetically sealing the barrier and the chamber.

BRIEF DESCRIPTION OF THE DRAWINGS

FIG. 1 is an elevation, partly in section, of a magnetic drive assembly incorporating the present invention.

FIG. 2 is a section through a pair of adjacent laminations in an exploded format.

FIG. 3 is a partial section of a magnetic drive assembly utilizing a second embodiment of the present invention.

FIG. 4 is a section through a pair of adjacent laminations of the second embodiment, in an exploded format.

DESCRIPTION OF THE INVENTION

A magnetic drive assembly incorporating the present invention is illustrated in FIG. 1 and carries reference number 10. Structurally the assembly includes a housing 12 having a pair of spaced apart end flanges 14,16 which in turn are interconnected in a suitable manner as by bolts 18. In the embodiment as illustrated the flanges 14,16 are circular and the bolts 18 are evenly circumferentially spaced about the center line 20. Each bolt 18 passes through a clearance hole 22 in the end flange 16, through a sleeve 24 positioned between the flanges 14,16 and is threadedly received in a threaded bore 26 in the opposite flange 14.

The end flanges bearingly support a shaft 28 which ultimately will be connected to a piece of equipment, such as a pump, which is to be driven thereby. End flange 16, as shown contains a recess 30 defined by an inwardly projecting (relative to the housing 12) annular boss 32. Recess 30 contains a ball bearing assembly 34 which bearingly supports one end 36 of the shaft 28. The other end flange 14 has an inwardly projecting (relative to the housing 12) annular boss 38 through which a central bore 40 passes, bore 40 being coaxial with recess 30. Bore 40 has an enlarged portion 42 which receives a ball bearing assembly 44 which, in turn, bearingly supports the other end 46 of the shaft 28.

Bearing 44 is held in the enlarged portion 42 by a circlip 48 mounted therein in a usual manner.

The enlarged bore portion 42 is actually partially contained in an outwardly projecting annular boss 50 which contains, in a recess 52 in the outer circumferential surface thereof, a sealing member such as an O-ring 54. When the drive assembly 10 is connected to a structure, such as a hyperbaric chamber (not shown), containing the item to be driven via shaft 28, the sealing member 54 will help to maintain a hermetic seal between that structure and the drive assembly 10.

Shaft 28, as illustrated, spans the distance between the end flanges 14,16 and passes beyond end flange 14 to be connected to an element to be driven thereby. In order to drive such an element shaft 28 must itself be driven: in the case of the present invention that is accomplished magnetically. Thus, shaft 28 supports a cylindrical carrier member 56 which, in turn, carries, embedded in the outer peripheral surface thereof, a plurality of equally circumferentially spaced permanent magnet elements 58 (only one being shown), circumferentially adjacent magnet elements being of opposite polarity. Typically, the magnet elements will be high energy rare-earth permanent magnets.

Exteriorly of the carrier member 56 is an annular drive member or carrier 60 which, in its inner peripheral surface, carries a plurality of equally peripherally spaced permanent magnet elements 62 (only one being shown), with peripherally adjacent magnets being of opposite polarity. As with magnet elements 58, the magnet elements 62 may be high energy rare-earth magnets.

Rotation of the drive carrier 60 will result, through magnetic interaction between the magnet elements 62 and 58 in rotation of the driven carrier 56 and consequent rotation of the shaft 28 and whatever is connected thereto. The mounting of the drive carrier will be discussed hereinafter.

Rotation of the drive carrier may be achieved in any convenient manner. In the illustrated embodiment the outer peripheral surface of the carrier 60 is provided with a plurality of V-grooves 64 which in turn receive V-belts 66, the V-belts being driven by a prime mover and imparting rotation to the carrier 60. While a particular mode of imparting rotation to the carrier 60 has been described it is understood that other equally effective modes could be utilized, such as chains, gears, flat belts, friction drives, direct drives, etc.

When a magnet drive assembly such as that previously described is to be used in an environment, such as a hyperbaric chamber, where the shaft 28 may be subjected to different atmospheres or pressures from that affecting the drive carrier, it becomes necessary to separate the drive carrier from the driven carrier. This can be achieved by a barrier 67 positioned between the two carriers and sealed to the end flanges. If the barrier is formed from a metallic material it will contribute to both power loss and heating due to eddy currents generated by the motion of the magnetic flux through the barrier. If the barrier is formed from a non-metallic material, the eddy current problems will be decreased, but in most pressure vessel applications such materials are not acceptable under current safety codes.

In order to overcome the above-identified problems the present invention utilizes a barrier 67 formed from a plurality of annular abutting laminations 68 of magnetically permeable material. In order to achieve the required mechanical stability of the laminations in shear and end thrust, the barrier, in the embodiment of FIGS. 1 and 2, has each lamination 68 formed so that the annular body portion thereof has the shape of a chevron in radial cross-section. As seen in the assembly of FIG. 1 and in the exploded view of FIG. 2 each lamination is formed so as to be nestable with the adjacent laminations.

In the assembly as shown in FIG. 1 annular thrust washers 70, 72 are mounted on the respective bosses 38 and 32. They act to hermetically seal the inner chamber 74 formed by the end flanges 14,16 and the barrier 67 of laminations 68; to help apply a compressive load on the laminations primarily applied by the bolts 18; and to mount the ball bearing assemblies 76,78 which bearingly support the driven carrier 80 for its rotative motion.

In the embodiment of FIGS. 3 and 4 the laminations 60 are formed as annular flat washers positioned in abutting relation to each other. In this embodiment a non-magnetic metallic or non-metallic thin wall pressure shell sealing sleeve 82 has a force fit with the inner periphery of the laminations 80 and the outer periphery of the bosses 32 and 38. The resilient annular thrust washers 84,86 have an interference fit on the sleeve 82 and perform the same function as the washers 70,72 of the first embodiment. While not illustrated in the drawings, a sleeve similar to sleeve 82 could be provided in the first embodiment to provide additional stability to the laminations 68 thereof. In each embodiment seals such as O-rings 88 may be provided, each in a recess 90 formed in the outer surface of the respective bosses 32,38 to additionally ensure the hermeticity of the chamber 74.

The laminations 68,80 are desirably formed from a metallic, non-magnetic material such as stainless steel with properties of high volume resistivity, magnetic transparency (diamagnetic), good corrosion resistance and acceptability as pressure vessel materials. The laminations may be coated with insulating material such as metallic oxides, plastics or varnish in which case hermeticity of the barrier is further enhanced by fusion of the insulating material under compression. When the assembly is completed the bolts 18 are torqued so that the laminations are prestressed in compression to a value that exceeds the maximum end thrust developed by the internal pressure that is to be contained within the chamber 74.

In a magnetic drive assembly constructed in accordance with any of the foregoing embodiments, the barrier of laminations 68 or 80 will reduce losses due to eddy currents, thereby providing a more efficient magnetic drive, and will also provide the necessary hermeticity for the internal chamber 74 formed by the barrier and the end flanges. Any desired length of barrier may be achieved merely by providing an appropriate number of laminations.

While preferred embodiments of the present invention have been described hereinabove, it is understood that structural variations therein may occur to a person skilled in the art and hence the protection to be afforded the present invention should be determined from the claims appended hereto.

The embodiments of the invention in which an exclusive property or privilege is claimed are defined as follows:

1. A magnetic drive assembly comprising: a housing including spaced apart end flange members; an annular drive member containing a plurality of drive magnets; a cylindrical driven member containing a plurality of driven magnets, the driven and drive members being concentrically bearingly supported by said end flange members so that rotation of the drive member will result, through magnetic interaction, in rotation of the driven member; a cylindrical barrier extending between said end flange members and separating said drive member from said driven member whereby said barrier and said end flange members define a chamber containing said driven member, said barrier being formed of a plurality of abutting axially adjacent annular laminations held in axial compression by said end flange members, each of said laminations in radial cross-section having a chevron shape whereby adjacent laminations are nestable with each other, and each lamination being formed of a non-magnetic ductile material to reduce eddy current losses; and means for hermetically sealing said barrier and said chamber.

2. The assembly of claim 1 wherein said sealing means includes a non-conductive insulating material coating the mating faces of each of said laminations.

3. The assembly of claim 1, including: means on each end flange member for radially and axially supporting said barrier; and means for interconnecting said flanges so as to apply a compressive axially directed force on said barrier.

4. The assembly of claim 1 or claim 2 including an inwardly directed annular boss on each end flange member; an annular thrust washer on each boss, each washer abutting a respective end of said barrier and the adjacent end flange member; bearing means mounted on each thrust washer for bearingly supporting said drive member; and a plurality of bolts interconnecting said end flange members to apply an axially directed compressive force to said barrier through said thrust washers.

5. A magnetic drive assembly comprising a housing including a pair of spaced apart end flanges, one of said flanges having a central recess containing bearing means for supporting one end of a driven shaft therein, the other of said flanges having a bore therethrough axially aligned with said recess and containing bearing means for supporting a portion of said shaft extending therethrough; a carrier member mounted on said shaft between said flanges and supporting a plurality of circumferentially spaced permanent magnet elements; axially inwardly directed boss means on each of said end flanges positioned radially outwardly of said shaft; an annular barrier member extending between said end flanges radially outwardly of said carrier member and including a plurality of axially adjacent annular laminations nested together over the length of said barrier member, each lamination having a chevron shape in radial cross-section, each lamination being formed of a non-magnetic ductile material; said barrier and said end flanges defining a chamber within said housing containing said shaft and carrier member; means hermetically sealing said chamber; bearing means on each of said boss means supporting a rotatable cylindrical drive member containing a plurality of circumferentially spaced permanent magnet elements facing said barrier; means for rotating said drive member; and means interconnecting said flanges to apply an axially directed compressive force to said barrier member.

6. The magnetic drive assembly of claim 5 wherein said sealing means comprises a non-conductive insulating material coating the mating faces of each of said laminations.

7. The magnetic drive assembly of claim 5 or claim 6 wherein annular thrust washer means are positioned on said boss means between each end of said barrier member and the adjacent end flange of said housing; said washer means serving to transmit said compressive force to said barrier member.

* * * * *